UNITED STATES PATENT OFFICE 2,410,781

TREATMENT OF GUAYULE

Albert J. Gracia, Cuyahoga Falls, and Henry V. Powers, Tallmadge, Ohio, assignors to Wingfoot Corporation, Akron, Ohio, a corporation of Delaware No Drawing. Application November 26, 1943, Serial No. 511,844. In Canada February 26, 1943

2 Claims. (Cl. 260—817)

This invention relates to the treatment of guayule rubber and more particularly to a process for treating guayule rubber to modify its character and properties so as to make it more adaptable for commercial uses in which natural Hevea rubber has customarily been employed.

In the early days of the rubber industry, a good many varieties of so-called "rubber" obtained from widely different plants, shrubs and trees were used but, as the industry developed, the material eventually employed was almost exclusively that derived from the *Hevea Brasiliensis*. This is the material which in recent years has been known as natural rubber. The other rubbers have been known as "wild" rubbers and have been used in very small amounts in recent years. However, with the present abnormal conditions of supply brought on by the war, attention is being directed anew toward some of the other natural rubber-like materials which, for economic reasons, and also because of generally inferior properties, have not been able to compete in the past with the product of the Hevea tree. One of the materials now being developed on a commercial scale is that known as guayule, which is obtained from a shrub growing naturally in the southwestern United States and in Mexico.

Guayule rubber is obtained from the plant by harvesting the entire shrub and subjecting it to mechanical treatment to remove the rubber therefrom. The rubber in the guayule plant is rather closely held by the plant structure, and in its removal substantial quantities of resins and woody or pithy materials are ordinarily included as impurities. The resinous material is a serious diluent and softener and for many uses of the guayule must be removed. This is usually accomplished by extraction with a solvent for the resin, such as acetone. However, even this purified guayule rubber from which the resin has been extracted is far inferior to Hevea rubber. The principal purpose of the present invention is to treat guayule rubber to make it more nearly approximate the quality of the Hevea rubber of commerce.

According to the practice of the invention, guayule rubber is treated with caustic at a somewhat elevated temperature and under pressure. If the guayule has not previously been completely deresinated, the caustic treatment removes a part of the resin. However, the effect produced is not merely the result of the deresination, since the caustic-treated material is definitely superior to guayule not so treated but having a comparable resin content. In addition to the caustic treatment, the guayule rubber is also deresinated by solvent treatment, which may either precede or follow the caustic treatment. Thus, the caustic treatment may be applied to the commercially available grade of deresinated guayule, or crude guayule may be treated with caustic and then with a solvent to remove the residual resin.

The improved quality of the product is particularly noticeable in its tear resistance, its flex resistance, its resilience and its general "nerve" and snap. Its superiority has also been demonstrated by building tires from it and actually operating the tires in a road test.

The practice of the invention is illustrated by the following example.

Fifteen pounds of baled crude Mexican guayule are sheeted off a rubber mill in one-eighth inch thick sheets, which are then cut into 2 inch squares. These are thrown into 5 gallons of aqueous 5% caustic soda solution, and agitated to keep the pieces from sticking together. This mixture is charged into a jacketed pressure vessel, and the steam pressure is raised to give a temperature of 150° C. in the kettle. This is held for 8 hours, at the end of which time the steam is turned off, the kettle is vented down, and the contents are discharged into a screen box. The treated guayule is washed with water in the box and is then put on a washing mill and washed with water for complete removal of caustic. When the damp rubber sheet shows neutral to litmus, the washing is stopped and the sheets are hung up to air dry. Drying at elevated temperatures causes sticky surfaces. Approximately half of the resin (normal content about 24%) is removed in the foregoing procedure. This material is then wound on a spindle, which is placed in an extractor for continuous solvent extraction. The extraction takes place in about 8 hours and the residual resin is removed down to about 1.0% or less. The rubber is then dried at room temperature or slightly above (solvent recovery can be provided in this step) and is finally milled into sheets for baling.

Relatively dilute solutions of caustic are satisfactory for the treatment, concentrations of about 2–5% having been found to work well. However, considerably higher concentrations may be used if desired, a 20% solution having been used successfully. Water is the preferred solvent, although alcohol has also been employed. The temperature should be in the neighborhood of 150° C., although it may vary 5 to 10 degrees above and below this figure while still obtaining satisfactory results. The time of treatment may also vary considerably, 7 to 9 hours having been found to be satisfactory. Free access of air during the caustic treatment should not be permitted, since oxygen seems to have a softening effect on the guayule. If desired, air may be eliminated from the reactor by evacuation or otherwise, but carrying out the process in the closed pressure vessel is satisfactory in most cases. In addition to the caustic soda of the example, other alkali metal hydroxides and carbonates, such as potassium hydroxide, sodium carbonate and potassium carbonate, may also be employed.

The deresination of the guayule by solvent extraction may be carried out in customary fashion, as for example by leaching out the resin with the condensed vapors from boiling acetone or other solvent or by soaking the rubber in a solvent for the resin. As previously pointed out, such solvent extraction may precede or follow the caustic treatment.

The product of the invention displays improved properties in a variety of rubber compounding formulae, and by the practice of the invention it is possible to improve guayule to such an extent that it can even be used for the production of tire treads to provide tires of practical value. Test tires in which the treads were made up from regular smoked sheet (Hevea rubber), acetone-extracted guayule and guayule which had been caustic treated and also acetone extracted, were tested and showed that, whereas acetone-extracted guayule gave only 65% of the wear obtained with Hevea rubber, the caustic and acetone-treated guayule gave 88% of normal wear. Thus, guayule treated according to the invention approaches the quality of Hevea rubber and is far superior to acetone-extracted guayule of comparable resin content.

We claim:

1. A method of treating guayule rubber which comprises heating it in a dilute aqueous caustic soda solution at a temperature of about 150° C. and then subjecting it to a solvent treatment to extract residual resinous matter.

2. A method of treating guayule rubber which comprises heating it for 7 to 9 hours at a temperature of about 150° C. in a 2 to 20 percent aqueous solution of a compound selected from the group consisting of alkali metal hydroxides and carbonates and also subjecting it to a solvent treatment to extract resinous matter therefrom.

ALBERT J. GRACIA.
HENRY V. POWERS.